United States Patent
Chan et al.

(10) Patent No.: US 8,285,755 B2
(45) Date of Patent: Oct. 9, 2012

(54) PARTIAL UPDATING IN A DATABASE PROXY DRIVER

(75) Inventors: Adrian Chan, Willowdale (CA); Ronen Grosman, Thornhill (CA); Teresa C. Kan, Rochester, MN (US); Yang Lei, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1732 days.

(21) Appl. No.: 11/249,217

(22) Filed: Oct. 13, 2005

(65) Prior Publication Data

US 2007/0088684 A1    Apr. 19, 2007

(51) Int. Cl.
    *G06F 17/30*      (2006.01)
(52) U.S. Cl. ......................................... 707/803; 707/705
(58) Field of Classification Search .............. 707/5, 705, 707/803; 705/65, 27; 717/27, 316, 310, 717/174, 172, 141, 129, 108
    See application file for complete search history.

(56) References Cited

U.S. PATENT DOCUMENTS

| | | | |
|---|---|---|---|
| 6,115,703 A | 9/2000 | Bireley et al. | |
| 6,438,559 B1 | 8/2002 | White et al. | |
| 2003/0051236 A1* | 3/2003 | Pace et al. | 717/177 |
| 2003/0055747 A1* | 3/2003 | Carr et al. | 705/27 |
| 2003/0220941 A1 | 11/2003 | Arnold et al. | |
| 2003/0233632 A1* | 12/2003 | Aigen et al. | 717/106 |
| 2004/0205180 A1 | 10/2004 | Srivastava et al. | |
| 2004/0215755 A1* | 10/2004 | O'Neill | 709/223 |
| 2005/0262110 A1* | 11/2005 | Gu et al. | 707/100 |

OTHER PUBLICATIONS

*Interface PreparedStatement*; Java 2 Platform Std. Ed. V. 1.4.2.
*Overpower the PreparedStatement*; JavaWorld, Jan. 2002.
Folkert, Nathan, *Introduction to JDBC*, Spring 2000.
*PreparedStatement Interface*, IBM Corporation 1992, 2004.

* cited by examiner

*Primary Examiner* — Shahid Alam
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to programmatic database access and provide a method, system and computer program product for programmatic partial updating of a row. In one embodiment, a data processing system for programmatic partial updating of a row in a database can include a database proxy driver configured to expose an interface for interacting with the database and to accept an execution of a prepared statement without requiring set values for all fields bound by the prepared statement. The interface can include, for example, a Java Database Connectivity (JDBC) compliant interface. The prepared statement can include a binding to multiple fields in a designated row and a set of setter methods defined for a subset of the multiple fields.

15 Claims, 2 Drawing Sheets

PARTIAL UPDATING IN A DATABASE PROXY DRIVER

BACKGROUND OF THE INVENTION

1. Field of the Invention

The present invention relates to the field of programmatic database access and more particularly to the field of programmatic database row updating utilizing a proxy driver.

2. Description of the Related Art

Database access middleware provides a stylized connection between an application computer program and a database. By stylized connection, it is meant that a database link has a formal, published definition. This formal, published definition can identify the interface through which connected application programs can issue data access requests and, in response thereto, receive database content through the database link. Two contemporary examples of database access middleware include the Open Database Connectivity (ODBC) and JDBC™ (Sun Microsystems, Inc.) specifications. ODBC and JDBC are important connectivity technologies because presently, ODBC and JDBC have been implemented in a bevy of disparate platforms while providing a common interface to several different database servers.

Primarily, database access middleware shuttles data requests and database content to and from application programs. In addition, database access middleware helps to ensure security, and it insulates the application from having to interact directly with the database server. Generalized query tools can utilize database access middleware (rather than the database server itself) to provide query services for multiple types of database products. Also, computer programs written according to Visual Basic, C, C++, Pascal, COBOL and other programming languages can perform database operations via ODBC. By comparison, programs based upon Java™ (Sun Microsystems, Inc.) technology can use JDBC to perform database operations.

JDBC technology is an application programming interface (API) that permits application programs to access virtually any tabular data source using the Java programming language. In consequence, JDBC technology provides cross database management system (DBMS) connectivity to a wide range of databases, and other tabular data sources, such as spreadsheets or flat files. With a JDBC enabled driver, a developer can easily connect all corporate data even in a heterogeneous environment.

The "Prepared Statement" is the preferred mechanism for accessing a relational database in JDBC. One often utilizes the PreparedStatement object when a structured query language (SQL) statement is to be run many times. It is well known that a SQL statement can be precompiled, and a Prepared Statement is a SQL statement that has been precompiled. Thus, the Prepared Statement approach can be more efficient than executing the same statement multiple times using a JDBC Statement object, which compiles the statement for each execution of the statement.

Notably, a Prepared Statement is the Java encapsulation of a parameterized query in which the SQL statement compiles a single time, but can execute many times. To change the query conditions, placeholders are utilized within the statement to indicate bind variables. An example follows:

```
PreparedStatement ps = con.prepareStatement
  ("UPDATE row SET col1 = ?, set col2 = ? ... set colN = ?
  WHERE key = ?")
```

In this statement, columns 1 through N are bound to variables denoted by the question marks. These variables can be completed in program code prior to calling the execution of the query. Importantly, every field in the statement must be specified prior to performing the query execution. Not one field can be omitted.

Accordingly, if only a portion of the row is to be updated, the reuse of the Prepared Statement can be limited in that different Prepared Statements must be generated for each combination of fields in a row to be updated. To generate a Prepared Statement for each combination of fields in a row to be updated, however, can exact a significant performance penalty due to SQL statement parsing and pre-compilation. First, it has been estimated that a total number of Prepared Statement combinations for updating a row of N fields excluding the primary key field is $(2^n-1)$. Thus, to cache so many possible Prepared Statements can impact memory to the tune of $(2^n-1)$ cache entries. Second, the parsing process must occur potentially $(2^n-1)$ times thereby incurring performance overhead in the SQL engine.

BRIEF SUMMARY OF THE INVENTION

Embodiments of the present invention address deficiencies of the art in respect to programmatic database access and provide a novel and non-obvious method, system and computer program product for programmatic partial updating of a row.

In one embodiment, a data processing system for programmatic partial updating of a row in a database can include a database proxy driver configured to expose an interface for interacting with the database and to accept an execution of a prepared statement without requiring set values for all fields bound by the prepared statement. The interface can include, for example, a JDBC compliant interface. The prepared statement can include a binding to multiple fields in a designated row and a set of setter methods defined for a subset of the multiple fields.

In another embodiment, a method for programmatically partially updating a row in a database can include creating an instance of a prepared statement, binding multiple fields in a designated row in the prepared statement, setting values only for a subset of the multiple fields in the prepared statement and executing the prepared statement. As an example, the setting of the values for a subset of the fields in the prepared statement can include setting a value only for a single one of the fields.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for programmatic partial updating of a row in a database proxy driver. In this regard, a prepared statement can be processed which binds all fields in a row. Only a subset of the fields, however, can be set prior to executing the prepared statement. The database proxy driver can receive the prepared statement only with the subset of the fields and the corresponding values to be set. In response, the database proxy driver can update only those fields in the subset in the designated row of a corresponding database. In this way, only a single prepared statement rather than ($2^n-1$) prepared statements need be precompiled (and cached) for use by the database proxy driver in order to accommodate all possible combinations of updated fields in a row.

Figure 1:
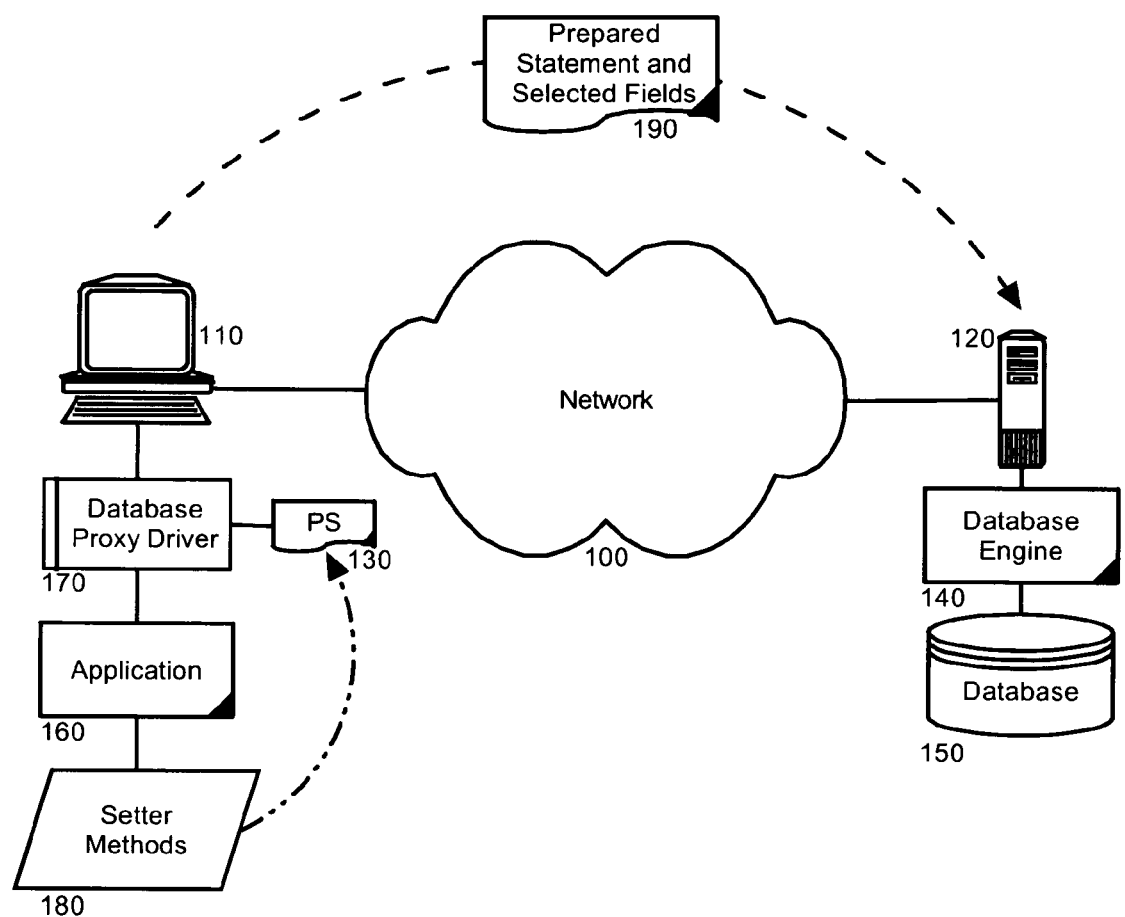
FIG. 1 is a schematic illustration of a database access data processing system configured for programmatic partial updating of a row in a database proxy driver; and, FIG. 2 is a flow chart illustrating a process for programmatic partial updating of a row in a database proxy driver.

In more particular illustration, FIG. 1 is a schematic illustration of a database access data processing system configured for programmatic partial updating of a row in a database proxy driver. The database access data processing system can include a database management system 120 coupled to a database engine 140 which can be configured to manage data within a database 150 and access to the data within the database 150. The database management system 120 further can be coupled to one or more database client systems 110 over a data communications network 100 which can range from a private network internal to a single computing host, to a global, public network across multiple computing hosts.

Each database client system 110 can host an application 160 programmed to access data within the database 150 through the database management system 120. To that end, the application 160 can be coupled to a database proxy driver 170 exposing an interface to the database management system 120. The interface exposed by the database proxy driver 170 can provide access to method members of the database proxy driver 170, and optionally data members of the database proxy driver 170 such that the data within the database 150 can be programmatically accessed within the application 160 by way of method calls to the database proxy driver 170.

Notably, the database proxy driver 170 can be particularly configured to permit the execution of a prepared statement 130 configured by setter methods 180 in the application 180 which do not set every field in a row to a value. Rather, the database proxy driver 170 can process the execution of the prepared statement 130 where only a subset of the fields in a designated row are set with a value through the operation of the setter methods 180. The database proxy driver 170, in turn, can pass the executed prepared statement 190 (and the subset of the fields set for the prepared statement) to the database management system 120 for processing in the database engine 140. The database engine 140, in turn, can update the subset of the fields in the row in the database 150 specified by the prepared statement 190 provided by the database proxy driver 170.

As an example, the following is valid programmatic code for use in the application 160 for partially updating a row in the database 150:

```
PreparedStatement ps = con.preparedStatement("UPDATE
row SET field1=?, SET field2=?, SET field3=?, SET
field4=? WHERE rowID=?);
ps.setInt(4, newField4Value);
ps.setInt(5, primaryKey);
ps.execute( );
```

The execution of the foregoing code results in the pessimistic "UPDATE row SET field4=? where rowID=?" and the execution can be processed validly even though field1, field2 and field3 had not been set prior to the execution of prepared statement.

As another example, the following is valid programmatic code for use in the application 160 for partially updating a row in the database 150:

```
PreparedStatement ps = con.preparedStatement("UPDATE
row SET field1=?, SET field2=?, SET field3=?, SET
field4=? WHERE rowID=? and field1=? and field2=? and
field3=? and field4=?);
ps.setInt(4, newField4Value);
ps.setInt(5, primaryKey);
ps.setInt(9, oldField4Value);
ps.execute( );
```

The execution of the foregoing code results in the optimistic "UPDATE row SET field4=? where rowID=? and field4=?" and the execution can be processed validly even though field1, field2 and field3 had not been set prior to the execution of prepared statement. Moreover, all of the existing fields in the row can be compared.

As yet another example, the following is valid programmatic code for use in the application 160 for partially updating a row in the database 150:

```
PreparedStatement ps = con.preparedStatement("UPDATE
row SET field1=?, SET field2=?, SET field3=?, SET
field4=? WHERE rowID=? and version=?);
ps.setInt(4, newField4Value);
ps.setInt(5, primaryKey);
ps.setInt(10, version);
ps.execute( );
```

The execution of the foregoing code results in the optimistic "UPDATE row SET field4=? where rowID=? and version=?" and the execution can be processed validly even though field1, field2 and field3 had not been set prior to the execution of prepared statement. Moreover, version column for the row can be compared.

Figure 2:
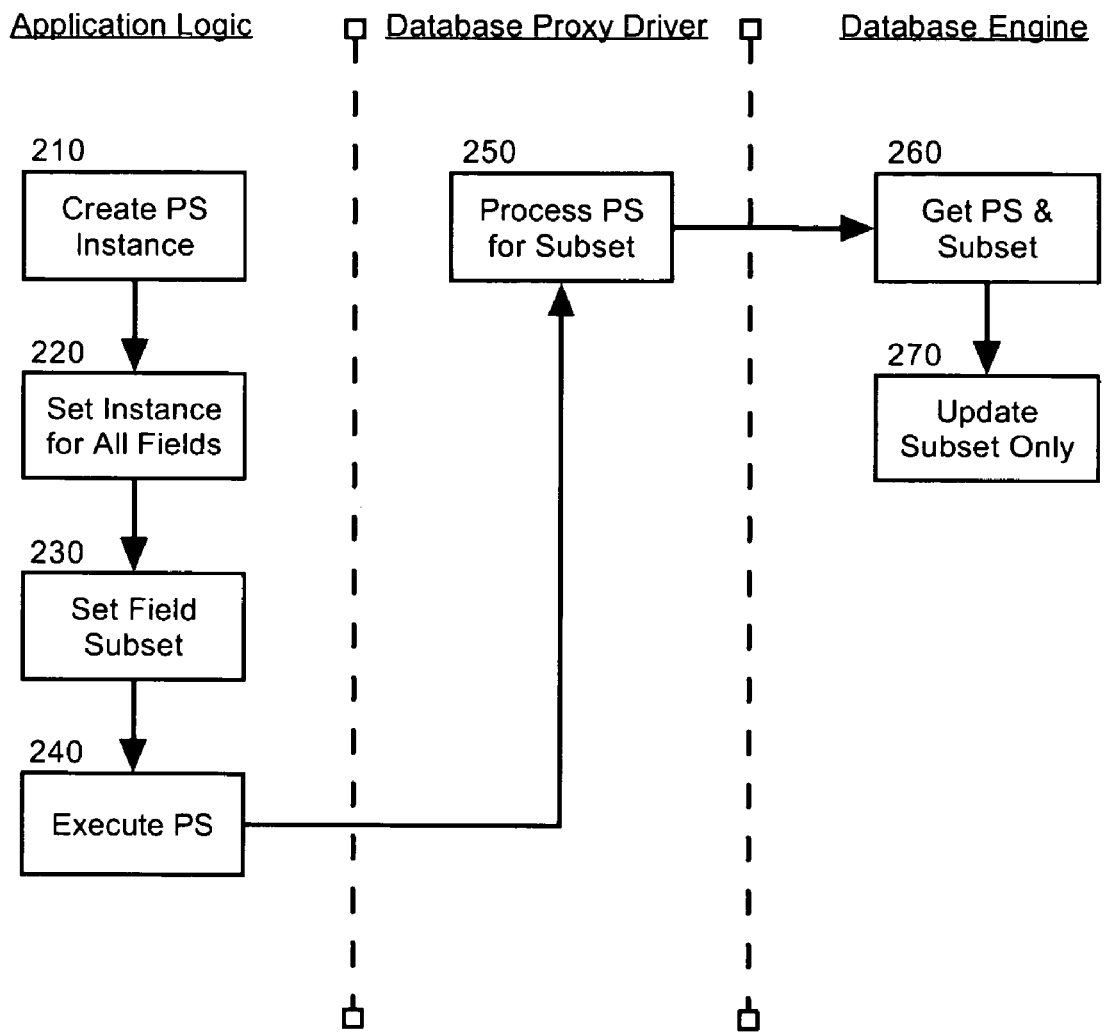

In further illustration, FIG. 2 is a flow chart illustrating a process for programmatic partial updating of a row in a database proxy driver. Beginning within the application logic in block 210, a prepared statement instance can be created. In block 220, the instance can be parameterized with all of the fields of a designated row. In block 230, only a subset of the fields can be set with values and in block 240, the prepared statement can be executed.

Once the prepared statement has been executed, the database proxy driver can process the executed prepared statement in block 250. Specifically, the database proxy driver can identify the subset of fields to be updated and the database proxy driver can forward the identified fields along with the prepared statement to the database engine 260. The database engine, in turn, can receive the prepared statement and subset of fields in block 260 and in block 270, the database engine can update only the subset of fields for the identified row in block 270.

In consequence of the present invention, one need only generate a single prepared statement for updating different fields in a row rather than generating a prepared statement for each combination of fields to be updated in a row. Moreover, once created programmatically, the same object can be reused multiple times for different subsets of fields. As a result, the utilization of caching resources and SQL parsing can be minimized and a singular access plan to the row can be maintained.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system for programmatic partial updating of a row in a database, the system comprising a database proxy driver configured to expose an interface for interacting with the database and to accept an execution of a prepared statement without requiring set values for all fields bound by said prepared statement.

2. The data processing system of claim 1, wherein said interface is a Java Database Connectivity (JDBC) compliant interface.

3. The data processing system of claim 1, wherein said prepared statement comprises:
a binding to a plurality of fields in a designated row; and,
a set of setter methods defined for a subset of said fields.

4. The data processing system of claim 3, wherein said prepared statement further comprises a comparison for selected ones of said fields in said designated row.

5. The data processing system of claim 3, wherein said prepared statement further comprises a comparison for a version field in said designated row.

6. A method for programmatically partially updating a row in a database, the method comprising:
creating an instance of a prepared statement;
binding a plurality of fields in a designated row in said prepared statement;
setting values only for a subset of said fields in said prepared statement; and,
executing said prepared statement.

7. The method of claim 6, wherein creating an instance of a prepared statement comprises instantiating a Java Database Connectivity (JDBC) PreparedStatement.

8. The method of claim 6, wherein binding a plurality of fields in a designated row in said prepared statement further comprises comparing selected ones of said fields.

9. The method of claim 6, wherein binding a plurality of fields in a designated row in said prepared statement further comprises comparing a version field for said designated row.

10. The method of claim 6, wherein setting values for a subset of said fields in said prepared statement comprises setting a value only for a single one of said fields.

11. A computer program product comprising a computer usable medium having computer usable program code for programmatically partially updating a row in a database, said computer program product including:
computer usable program code for creating an instance of a prepared statement;
computer usable program code for binding a plurality of fields in a designated row in said prepared statement;
computer usable program code for setting values only for a subset of said fields in said prepared statement; and,
computer usable program code for executing said prepared statement.

12. The computer program product of claim 11, wherein said computer usable program code for creating an instance of a prepared statement comprises computer usable program code for instantiating a Java Database Connectivity (JDBC) PreparedStatement.

13. The computer program product of claim 11, wherein said computer usable program code for binding a plurality of fields in a designated row in said prepared statement further comprises computer usable program code for comparing selected ones of said fields.

14. The computer program product of claim 11, wherein said computer usable program code for binding a plurality of fields in a designated row in said prepared statement further comprises computer usable program code for comparing a version field for said designated row.

15. The computer program product of claim 11, wherein said computer usable program code for setting values for a subset of said fields in said prepared statement comprises computer usable program code for setting a value only for a single one of said fields.

* * * * *